United States Patent [19]

Perkins, III et al.

[11] 3,743,902

[45] July 3, 1973

[54] BRUSHLESS DC MOTOR

[75] Inventors: William L. Perkins, III, Springfield, Mass.; David C. Fisk, Enfield, Conn.

[73] Assignee: United Aircraft Corporation, East Hartford, Conn.

[22] Filed: June 9, 1972

[21] Appl. No.: 261,209

[52] U.S. Cl. .............................. 318/138, 318/326
[51] Int. Cl. .......................................... H02k 29/00
[58] Field of Search.................... 318/138, 254, 326, 318/328

[56] References Cited
UNITED STATES PATENTS 3,696,277  10/1972  Liska .................................. 318/138
3,696,278  10/1972  Kuniyoshi ........................... 318/138

*Primary Examiner*—Bernard A. Gilheany
*Assistant Examiner*—Thomas Langer
*Attorney*—Melvin Pearson Williams

[57] ABSTRACT

Hall sensors mounted upon the armature of a two phase torque motor provide sensor voltages indicative of the relative positions of each of two armature windings with respect to poles of the rotor. A speed comparator provides a signal when the motor's speed is below a desired speed. In concurrent response to the signal from the comparator and the sensor voltages, each winding has voltages applied thereto only when each is in a region of maximum flux of the rotor.

6 Claims, 4 Drawing Figures

BRUSHLESS DC MOTOR

BACKGROUND OF THE INVENTION

1. Field of the Invention

This invention relates to brushless DC motors, and more particularly to improvements in providing excitation to a two phase motor for causing it to rotate at a constant speed.

2. Description of the Prior Art

Conventional DC motors utilize brushes and a commutator to switch armature current provided by a source of DC voltage. The brushes make and break contact with the commutator typically causing a high failure rate thereof due to friction. Additionally, the making and breaking of contact may cause arcs between the brushes and the commutator that pose a safety hazard in space vehicles where there may be an oxygen-rich atmosphere. The arcing may also be a significant source of electromagnetic interference.

To overcome the problems of conventional DC motors in space vehicles, brushless DC motors are commonly used. Two types of brushless DC motors have been developed; these are the "true" brushless DC motor and the "pseudo" brushless DC motor.

The "true" brushless DC motor is comprised of a permanent magnet rotor and either optical, capacitive, inductive or magnetic sensors for sensing the angular position of the rotor relative to the stator. The output of the sensors are used to switch the armature current electronically. In "true" brushless DC motors known in the prior art, usually the alignment of the sensors is critical or the motors are highly restrictive in their range of application; that is to say, a motor useful in one application would probably be unsuitable for other applications.

A "pseudo" brushless DC motor is comprised of a DC/AC inverter which is coupled to an AC motor. Conditioning circuitry, such as inverters, causes the "pseudo" brushless DC motor to be less efficient than the "true" brushless DC motor. Hence, the "pseudo" brushless DC motor is not desirable for use aboard a space vehicle.

SUMMARY OF THE INVENTION

The object of the present invention is to provide improved apparatus for driving a motor at a desired speed.

According to the present invention, excitation is provided to an armature winding of a motor only when the speed of the motor is less than a desired speed and the winding is in a region of maximum flux of the motor's field.

Providing excitation to armature windings only when they are in a region of maximum flux causes the motor to be driven efficiently. Since the excitation provided to the motor may be in the form of pulses, compatible drive circuitry may be of the digital type which is also efficient.

Other objects, features and advantages of the present invention will become more apparent in the light of the following detailed description of preferred embodiments thereof as illustrated in the accompanying drawing.

DESCRIPTION OF THE PREFERRED EMBODIMENT

In two phase torque motors known in the prior art, the rotor may comprise a rotating permanent magnet of two or more poles and the stator may comprise a pair of armature windings. The north and south poles of the magnet are mounted alternately on the rotor. Therefore, as the rotor rotates bringing a north rotor pole opposite an armature winding, the flux density in the winding increases to a maximum and has a polarity associated with the north rotor pole. Further rotation brings the winding to a location midway between the north rotor pole and an adjacent south rotor pole, causing the flux density in the winding to be zero. Additional rotation brings the south rotor pole opposite the winding which causes the flux density in the winding to again be a maximum but with a polarity associated with the south rotor pole. In general, as the rotor rotates the flux changes sinusoidally in the armature windings with 180° corresponding to the angular distance between adjacent poles.

It is well known that the torque provided to the rotor is proportional to the product of the current in the armature winding and the density of the flux therein. In the present invention, apparatus provides a voltage to each of the windings only when each is in a region where maximum flux is provided by the rotor, thereby maintaining the efficiency of the motor at a high level.

Figure 1:
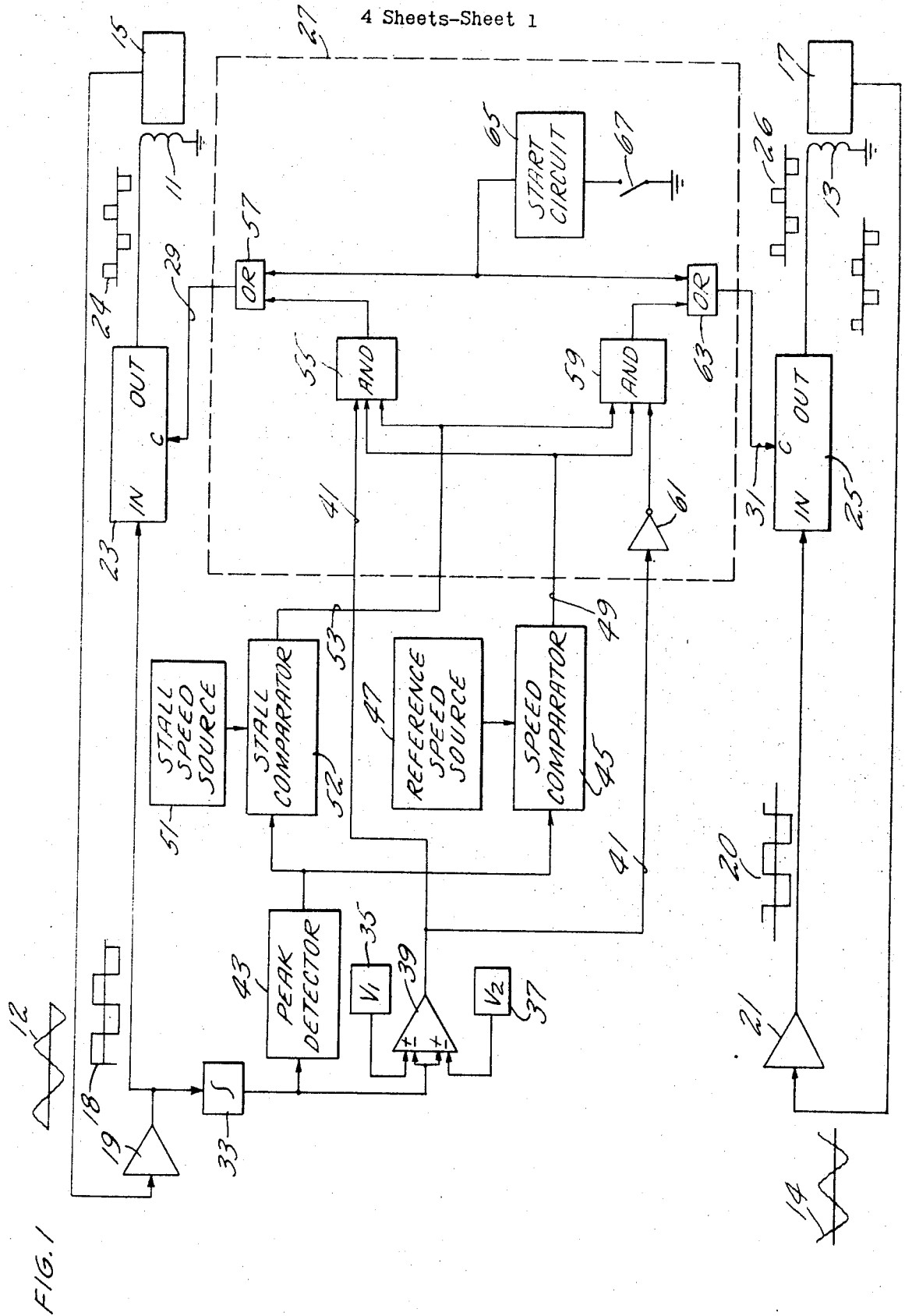
FIG. 1 is a schematic diagram of a first embodiment of the present invention.
Figure 2:
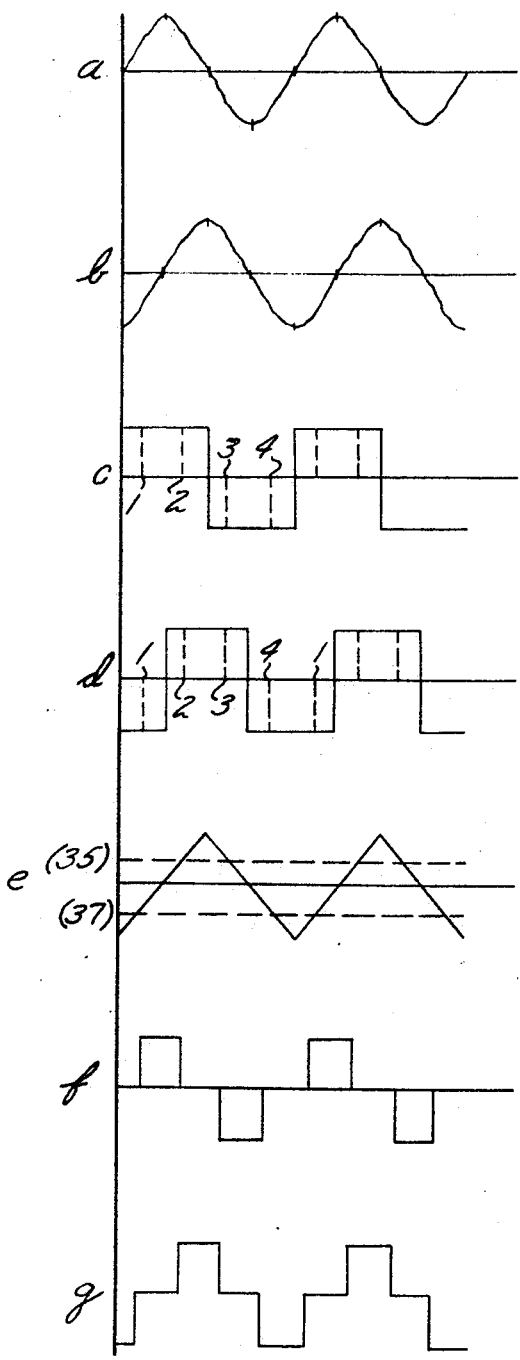
FIG. 2 is an illustration of different voltage relationships in the circuitry of FIG. 1 during a cycle of operation.

Referring now to FIG. 1, in a first embodiment of the present invention the armature of a two phase motor is comprised of a phase one armature winding 11 and a phase two armature winding 13. A phase one Hall sensor 15 and a phase two Hall sensor 17 are mounted upon the armature structure respectively disposed in association with the windings 11, 13. The sensors 15, 17 are semiconductor devices of a well-known type which provide a sensor voltage proportional to a sensed magnetic field. The sensors 15, 17 therefore provide sensor voltages proportional to the motor field flux in the windings 11, 13 respectively. In response to the motor rotating at a constant velocity, the motor's field causes the sensors 15, 17 to provide substantially sinusoidal sensor voltages as illustrated by waveforms 12, 14 respectively. The sensor voltages have a phase difference of 90°. Referring to FIG. 2, illustrations a and b show the phase one and phase two sensor voltages, respectively, on a common abscissa. (As explained hereinbefore 180° corresponds to the angular distance between adjacent poles of the rotor. Therefore, locations on the common abscissa of the illustrations of FIG. 2 correspond to locations on the armature with respect to poles of the rotor.) It should be understood that the sensors 15, 17 typically provide sensor voltages having substantial distortion. High gain amplifiers 19, 21 have their inputs connected to the sensors 15, 17 respectively. The amplifiers 19, 21 amplify and clip the sensor voltages, each providing a train of rectangular voltage pulses in response thereto. Because of the amplification and clipping, only the zero crossings of the sensor voltages are retained at the output of the output of the amplifiers 19, 21, thereby minimizing the effects of distortion. The rectangular pulses provided by the amplifiers 19, 21 have amplitudes suitable for driving the armature windings. Illustrations c and d, FIG. 2 show the rectangular pulses provided by the amplifiers 19, 21 in response to the phase one and phase two sensor voltages, respectively. The rectangular pulses are further illustrated by waveforms 18, 20 (FIG. 1), respectively.

Analog switches 23, 25 have respective inputs connected to the amplifiers 19, 21 and respective outputs connected to the windings 11, 13. In the present invention, when the motor's speed is below the desired speed (but above a preselected stall speed) the switch 23 is selectively closed to cause application of the portions of the rectangular pulses (provided by the amplifier 19) between locations 1 and 2 and between locations 3 and 4 (illustration c, FIG. 2) to the winding 11. Voltage is thereby applied to the winding 11 only when it is located near a pole of the rotor. Similarly, the switch 25 is selectively closed to cause application of the rectangular pulses (provided by the amplifier 21) between locations 2 and 3 and between locations 4 and 1 (illustration d, FIG. 2) to the winding 13. Voltage is thereby applied to the winding 13 only when it is located near a pole of the rotor. When the motor's speed is above the desired speed, no voltage is applied to the windings 11, 13. The switches 23, 25 and many of the elements included in this embodiment provide or are responsive only to logic signals which consist of logical ONE or ZERO. In this embodiment, ONE is approximately 3.5 volts and ZERO is approximately ground; in other specific embodiments, logic signals may be associated with other voltages. ONE applied to a control input of an analog switch, such as the switches 23, 25, causes a closure thereof. ZERO applied to the control input causes an analog switch to be open. A digital unit 27 provides logic signals on lines 29, 31 to control inputs (c) of the switches 23, 25 respectively. The selective closure of the switch 23 described hereinbefore provides a voltage on the winding 11 having a waveform shown in illustration f, FIG. 2, and further illustrated by a waveform 24 (FIG. 1). The selective closure of the switch 25 provides a voltage on the winding 13 having a waveform shown in illustration g, FIG. 2 and further illustrated by a waveform 26 (FIG. 1).

An integrator 33 has its input connected to the output of the amplifier 19. Rectangular pulses provided by the amplifier 19 (illustration c, FIG. 2) are integrated by the integrator 33 thereby providing triangular pulses (illustration e, FIG. 2) which are indicative of the motor's speed. As explained hereinbefore, the flux in the windings 11, 13 is associated with the position of the windings 11, 13 with respect to the poles of the rotor. Therefore, the change in the flux, and hence the frequency of the phase one sensor voltage (and the frequency of the voltage provided by the amplifier 19) is proportional to the motor's speed. It follows that the lower the motor's speed, the more time the integrator 33 has to integrate each rectangular pulse thereby causing the peak amplitude of a triangular pulse to be greater at lower speeds (the peak amplitude of the triangular pulse is inversely proportional to the motor's speed). It should be understood that the maximum and minimum amplitudes of the triangular pulses are known constant values when the motor speed equals the desired speed. Additionally, the instantaneous voltage provided by the integrator 33 is representative of the location of the winding 11 with the maximum and minimum of the triangular pulse occurring when winding 11 is at a location midway between adjacent poles of the rotor (illustrations c and e, FIG. 2). ZERO crossings of the triangular pulse occurs when the winding 11 is opposite a pole. Since the location of the winding 13 is known with respect to the winding 11, the output of the integrator 33 is also representative of the location of the winding 13. Accordingly, first and second reference voltage sources 35, 37 respectively provide a voltage (V1) equal to one-half of the known positive peak voltage and a voltage (V2) equal to one-half of the negative peak voltage of the triangular pulse associated with the desired speed. Illustration e, FIG. 2, shows dashed lines representative of the amplitudes of the voltages provided by the sources 35, 37. A window comparator 39 has inputs connected to the sources 35, 37 and to the output of the integrator 33. A ONE signal on a line 41 is provided by the comparator 39 only in response to the output of the integrator 33 being less positive than the source 35 and more positive than the source 37. A comparison of illustrations c, d and e of FIG. 2 shows that at the locations 1 and 4, the voltage provided by the source 37 equals the output of the integrator 33; at the locations 2 and 3, the voltage provided by the source 35 equals the output of the integrator 33. Because the sources 35, 37 provide voltages equal to one-half the peak values of the triangular pulse associated with the desired speed, a rotor position causing the winding 11 to be between the locations 1 and 2 or between the locations 3 and 4 (when the motor's speed is close to the desired speed) substantially corresponds to the winding 11 being within 90° of a location opposite a pole. For the same reason, a rotor position causing the winding 13 to be between the locations 2 and 3 and between the locations 4 and 1 substantially corresponds to the winding 13 being within 90° of a location opposite a pole. Furthermore, the output of the integrator 33 causes a ONE signal at the output of the comparator 39 only between the locations 1 and 2 and between the locations 3 and 4 (which corresponds to the locations where the ONE signal is provided on the line 29 for the selective closure of the switch 23 described hereinbefore). Therefore, the output of the integrator 33 causes a ZERO signal at the output of the comparator 39 between the locations 2 and 3 and between the locations 4 and 1 (which corresponds to the locations where the ONE signal is provided on the line 31 for the selective closure of the switch 25). Apparatus for providing the signals on the lines 29, 31 for the selective closures is described hereinafter.

A peak detector 43, a speed comparator 45, and a reference speed voltage source 47 comprise apparatus for providing a logic signal on a signal line 49 indicative of the motor's speed being less than a desired speed. The input of the peak detector 43 is connected to the output of the integrator 33 and provides in response thereto a peak voltage substantially equal to the positive peak voltage provided by the integrator 33 (illustration e, FIG. 2). The source 47 provides a voltage representative of the desired speed of the motor. The speed comparator 45 which has inputs connected to the peak detector 43 and the source 47 provides a ONE signal on the line 49 only when the motor's speed is less than the desired speed.

In many applications, such as in space vehicles, it may be desirable to discontinue applying power to a motor when an excessive load on the motor's shaft causes it to have a speed substantially lower than the desired speed. Accordingly, a stall speed source 51 provides a voltage representative of a selected speed lower than the desired speed (referred to as a stall speed hereinafter). A stall comparator 52 which has inputs connected to the peak detector 43 and the source 51, provides a ZERO signal on a signal line 53 only when the motor's speed is less than the stall speed.

In the unit 27 an AND gate 55 has inputs provided on the lines 41, 49, 53. When the comparators 45, 52 provide ONE signal on the lines 49, 53 in response to the motor's speed being less than the desired speed and greater than the stall speed, the gate 55 provides a ONE signal in response to the comparator 39 providing a ONE signal on the line 41. An OR gate 57 has an input connected to the output of the gate 55 and its output connected to the line 29. A ONE signal is transmitted from the gate 55 through the gate 57, through the line 29 for selective closure of the switch 23. Similarly, and AND gate 59 has inputs provided on the lines 49, 53. An inverter 61 provides to an input of the gate 59 the complement of input signals provided by the comparator 39 through the line 41. When the comparators 45, 52 provide a ONE signal on the lines 49, 53 in response to the motor's speed being less than the desired speed and greater than the stall speed, the gate 59 provides a ONE signal in response to the inverter 61 providing a ONE signal (when the comparator 39 provides a ZERO signal). An OR gate 63 has an input connected to the output of the gate 59, the output of the gate 63 being connected to the line 31. A ONE signal is transmitted from the gate 59 through the gate 63, through the line 31 for selective closure of the switch 25.

In starting the motor, there is an ambiguity because the comparators 45, 52 may provide logic signals indicative of the motor's speed being in excess of the desired speed. If, for example, the output of the integrator 33 is negative because the motor is stopped when the winding 11 is between locations 4 and 1 (illustration c, FIG. 2), a responsive output of zero from the peak detector 43 indicates a speed in excess of the desired speed (since the output of the peak detector is inversely proportional to the motor's speed) thereby causing the ambiguity. A start circuit 65 is included in the logic unit 27 in order to resolve the ambiguity. A switch 67 connected to the circuit 65 is first closed when starting the motor and opened after when the motor's speed is above the stall speed. The circuit 65 provides a ONE signal at its output in response to closure of the switch 67. The OR gates 57, 63 each have an input connected to the output of the start circuit 65. A ONE signal provided by the start circuit 65 is transmitted through the gates 57, 63 through the lines 29, 31 to the switches 23, 25 thereby applying to the windings 11, 13 output voltages of the amplifiers 19, 21 (illustrations c and d, FIG. 2). Hence during the starting of the motor, the switches 23, 25 are forced to remain closed (instead of being selectively closed).

Figure 3:
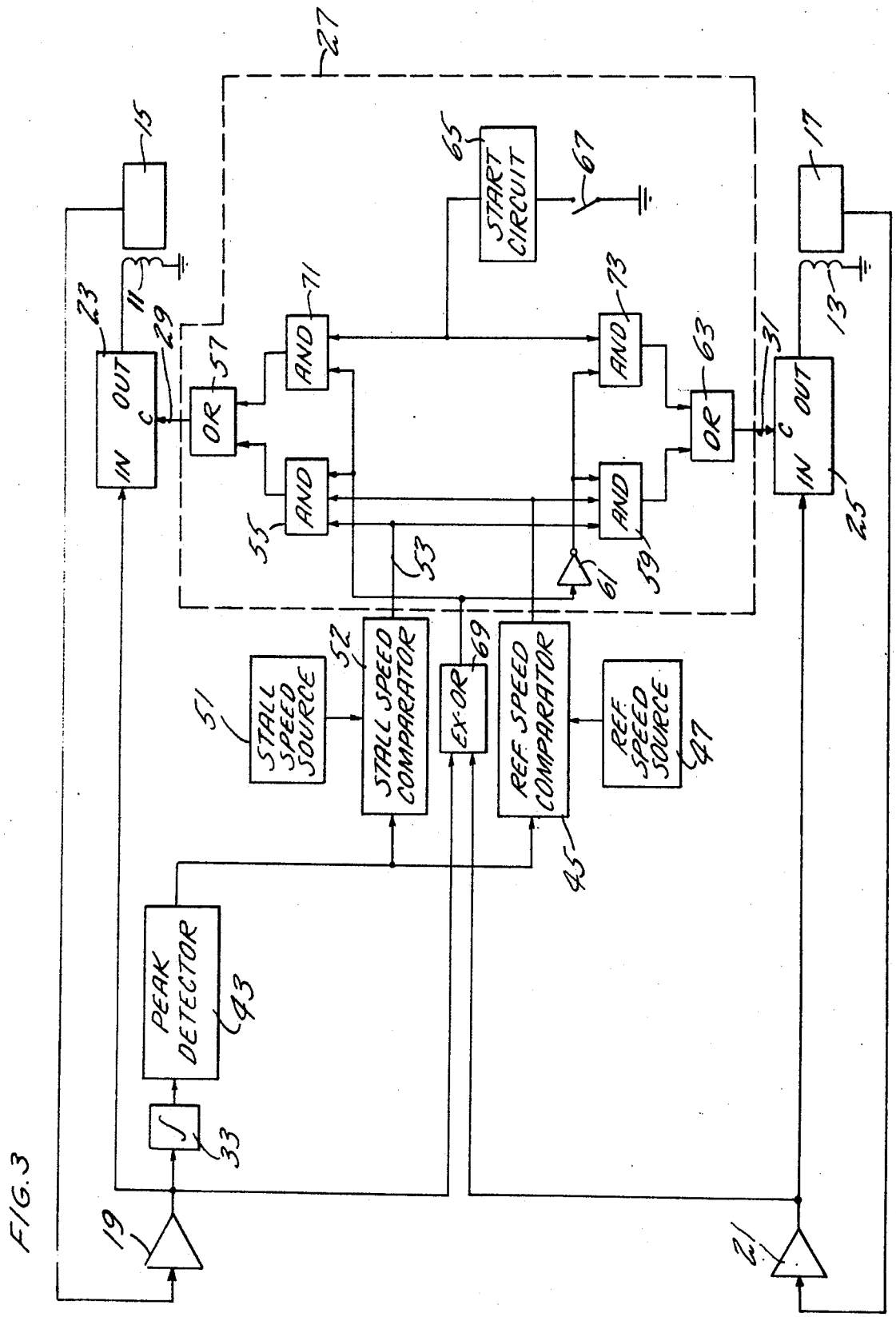
FIG. 3 is a schematic diagram of a second embodiment of the present invention.
Figure 4:
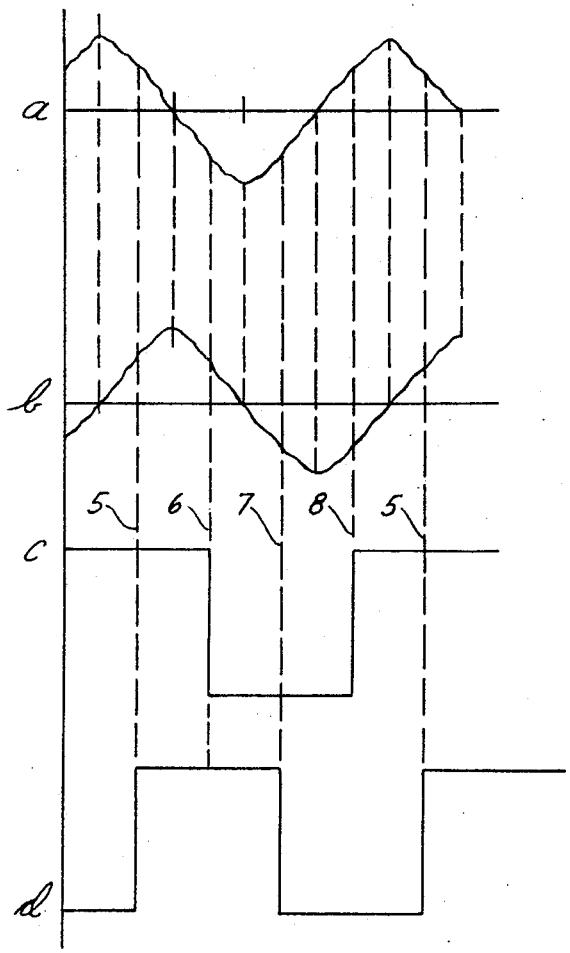
FIG. 4 is an illustration of different voltage and magnetic flux relationship in the circuitry of FIG. 3 during a cycle of operation.

In a second embodiment of the present invention, selective switch closures provide efficient motor operation when the motor is being started. The sensors 15, 17 are mounted on the armature to cause a 45° phase shift between the flux in the armature and the sensed voltage when the motor is rotating at a constant velocity. Referring now to FIGS. 3 and 4, illustrations a and b (FIG. 4) are illustrative flux provided by the rotor to the windings 11, 13 (FIG. 3), respectively. Illustrations c and d (FIG. 4) are illustrative of the voltages provided by the amplifiers 19, 21 (FIG. 3). In a typical cycle of selective closure by signals on the line 29 (causing a 90° span about the maxima of illustration a, FIG. 4), the switch 23 is closed only when the winding 11 is between locations 5 and 6 and between locations 7 and 8. In a typical cycle of selective closure by signals on the line 31 (causing a 90° span about the maxima of illustration b, FIG. 3) the switch 25 is closed only when the winding 13 is between the locations 6 and 7 and between the locations 8 and 5. Signals for selective closures are provided on the lines 29, 31 in a manner described hereinafter.

An EXCLUSIVE OR gate 69 has inputs respectively connected to the outputs of the amplifiers 19, 21. The gate 69 provides a ONE signal whenever the amplifiers 19, 21 provide signals of different polarities (illustrations c and d, FIG. 4 between locations 5 and 6 and between locations 7 and 8). A comparison of illustrations a, c and d of FIG. 4 shows that a ONE signal provided by the gate 69 is a condition for closure of the switch 23. Accordingly, when the motor's speed is above the stall speed but less than the desired speed, a ONE signal is provided by comparators 45, 52 through the lines 49, 53 to inputs of the gate 55. A ONE signal then provided by the gate 69 causes a ONE signal at the output of the gate 55 which is transmitted through the gate 57, through the line 29 to the switch 23. In a similar manner the gate 69 provides a ZERO signal (illustrations c and d, FIG. 4 between the locations 6 and 7 and between the locations 8 and 5) whenever the amplifiers 19, 21 provide signals of the same polarity. A comparison of illustrations b, c and d of FIG. 4 shows that a ZERO signal provided by the gate 69 is a condition for closure of the switch 25. The output of the gate 69 is connected to the input of the inverter 61. When the motor's speed is above the stall speed but less than the desired speed, a ONE signal is provided by comparators 45, 52 through the lines 49, 53 to inputs of the gate 59. A ONE signal then provided at the output of the inverter 61 (ZERO at the output of the gate 69) causes a ONE signal at the output of the gate 59 which is transmitted through the gate 63, through the line 31 to the switch 25.

A pair of AND gates 71, 73 each have an input connected to the output of the circuit 65. When the motor is being started, the signals for selective closure are provided by the gate 69 through the gates 71, 57 through the line 29 to the switch 23. Similarly, selective closure signals are provided by the gate 69 and the inverter 61 through the gates 73, 63 through the line 31 to the switch 25.

Although the invention has been shown and described with respect to a preferred embodiment thereof, it should be understood by those skilled in the art that changes and omissions in the form and detail thereof may be made therein without departing from the spirit and the scope of the invention.

Having thus described a typical embodiment of our invention, that which we claim as new and desire to secure by Letters Patent of the United States is:

1. Apparatus for controlling the speed of a brushless DC motor having a permanent magnetic field that rotates with respect to at least one armature winding, the flux in said winding varying with the location thereof within the field, comprising:

sensor means responsive to the magnetic flux of said permanent magnetic field for providing a sensor signal substantially corresponding to the magnetic flux in said winding;

a high gain amplifier means responsive to said sensor signal for amplifying and clipping said sensor signal to provide a rectangular voltage in phase with said sensor voltage;

an analog switch having a control input and having a voltage input connected to the output of said high gain amplifier and having an output connected to said armature winding, said switch providing the voltage output of said high gain amplifier to said armature winding when said switch is actuated by a signal at its control input;

a voltage integrator means having its input connected to the output of said high gain amplifier and providing at its output a triangular voltage which lags said rectangular voltage by a quarter cycle;

a reference voltage; and a window comparator means connected to the output of said integrator and to said reference voltage source and providing an output signal during periods of time when said triangular voltage is of the same polarity as and lower in magnitude than said reference voltage, the output of said comparator being connected to the control input of said analog switch, whereby said armature is driven only when it is in a region of maximum flux.

2. Apparatus according to claim 1 further comprising:

a peak detector connected to the output of said integrator;

speed reference means for providing a signal voltage representative of a desired speed;

speed comparison means for comparing the output of said peak detector with the voltage signal of said reference means and providing a low speed output signal in response to the relationship between its inputs indicating that the speed of the motor is below the desired speed represented by said reference means; and means responsive to the output of said speed comparison means to block the output signal of said window comparator from actuating the control input of said analog switch in response to the absence of the output of said low speed signal from said speed comparison means.

3. Apparatus according to claim 1 further comprising:

a peak detector connected to the output of said integrator;

stall reference means for providing a voltage signal representative of a stall speed below which operation of said motor is not desired;

a stall comparator having its inputs connected to the outputs of said stall reference means and said peak detector and providing an above-speed output signal in response to said peak detector indicating a speed in excess of said stall speed; and means responsive to the output of said stall comparator for blocking the output of said window comparator from actuating the control input of said analog switch in response to the absence of said above-speed signal.

4. Apparatus for controlling the speed of a two phase brushless DC motor having a permanent magnetic field that rotates with respect to at least a pair of armature windings, the flux in said windings varying with the location thereof within the field, the flux in a first winding leading the flux in a second winding by one quarter cycle; comprising:

a pair of sensor means, each responsive to the magnetic flux of said permanent magnetic field for providing a sensor signal substantially corresponding to but lagging by an eighth of a cycle the magnetic flux in a related one of said armature windings;

a pair of high gain amplifier means, each responsive to the sensor signal provided by a related one of said sensor means for amplifying and clipping said sensor signal to provide a corresponding rectangular voltage in phase with the related sensor voltage;

a pair of analog switches, each having a control input and having a voltage input connected to the output of the related one of said high gain amplifiers and having an output connected to the related one of said armature windings, each of said switches providing the voltage output of said related high gain amplifier to said related armature winding when said switch is actuated by a signal at its control input;

an exclusive OR circuit responsive to the outputs of both of said high gain amplifiers, said exclusive OR circuit providing an output signal in response to the outputs of said high gain amplifiers being of opposite polarity; and means responsive to the presence of an output from said exclusive OR circuit for providing a signal to the control input of a first one of said analog switches relating to said first armature winding, thereby to provide the output of the related high gain amplifier to drive said first armature winding, and responsive to the absence of an output signal from said exclusive OR circuit for providing a signal to the control input of a second one of said analog switches relating to said second armature winding, thereby providing the output of the related high gain amplifier to drive said second armature winding.

5. Apparatus according to claim 4 further comprising:

speed means responsive to the output of one of said high gain amplifiers for providing a voltage signal representative of the speed of said motor;

reference means for providing a voltage signal representative of a desired speed;

speed comparison means for comparing the output of said speed means with the voltage signal of said reference means and providing a low speed output signal in response to the relationship between its inputs indicating that the speed of the motor is below the desired speed represented by said reference means; and means responsive to the output of said speed comparison means to block the output signal of said exclusive OR circuit from actuating the control inputs of said analog switches in response to the absence of the output of said low speed signal from said speed comparison means.

6. Apparatus according to claim 1 further comprising:
- means responsive to the output of one of said high gain amplifiers for providing a voltage signal representative of the speed of said motor;
- stall reference means for providing a voltage signal representative of a stall speed below which operation of said motor is not desired;
- a stall comparator having its inputs connected to said stall reference means and to the output of said speed means and providing an above-speed output signal in response to said speed means indicating a speed in excess of said stall speed; and
- means responsive to the output of said stall comparator for blocking the output of said exclusive OR circuit from actuating the control inputs of said analog switches in response to the absence of said above-speed signal.

* * * * *